United States Patent [19]

Krueger et al.

[11] Patent Number: 4,896,330
[45] Date of Patent: Jan. 23, 1990

[54] GAS LASER

[75] Inventors: Hans Krueger, Munich; Wolfgang Welsch, Baldham; Hans Golser, Munich, all of Fed. Rep. of Germany

[73] Assignee: Siemens Aktiengesellschaft, Berlin and Munich, Fed. Rep. of Germany

[21] Appl. No.: 205,995

[22] Filed: Jun. 13, 1988

[30] Foreign Application Priority Data

Jun. 12, 1987 [DE] Fed. Rep. of Germany ....... 3719745

[51] Int. Cl.$^4$ .............................................. H01S 3/63
[52] U.S. Cl. ....................................... 372/65; 372/107; 372/108
[58] Field of Search ...................... 372/107, 61, 65, 37, 372/64, 92; 378/108

[56] References Cited

U.S. PATENT DOCUMENTS

| | | |
|---|---|---|
| 3,628,175 | 12/1971 | Rigden . |
| 3,681,710 | 8/1972 | Lary et al. ............................. 372/60 |
| 3,783,404 | 1/1974 | Matsuoka ............................... 372/65 |
| 3,805,015 | 4/1974 | Herziger et al. ..................... 372/107 |
| 3,864,029 | 2/1975 | Mohler ................................. 372/107 |
| 4,045,129 | 8/1977 | Hamar .................................. 372/107 |
| 4,081,762 | 3/1978 | Golser . |
| 4,238,743 | 12/1980 | Golser et al. . |
| 4,311,961 | 1/1982 | Holt et al. . |
| 4,439,862 | 3/1984 | Mohler ................................. 372/107 |
| 4,464,763 | 8/1984 | Mohler ................................. 372/107 |
| 4,613,972 | 9/1986 | Bettman ............................... 372/65 |
| 4,638,486 | 1/1987 | Dost et al. ........................... 372/107 |
| 4,644,554 | 2/1987 | Sheng .................................. 372/65 |
| 4,649,546 | 3/1987 | Schmid . |
| 4,742,527 | 5/1988 | Wiedemann et al. ................ 372/61 |

Primary Examiner—Léon Scott, Jr.
Attorney, Agent, or Firm—Hill, Van Santen, Steadman & Simpson

[57] ABSTRACT

A gas laser includes a housing tube and a capillary projecting therebeyond and having a Brewster window attached at a free end of the capillary. Laser power is increased without an increase in laser length by providing a mirror which terminates the housing in vacuum-tight fashion and is secured to the housing tube beyond an end of the capillary as an extension of the discharge channel of the capillary.

22 Claims, 1 Drawing Sheet

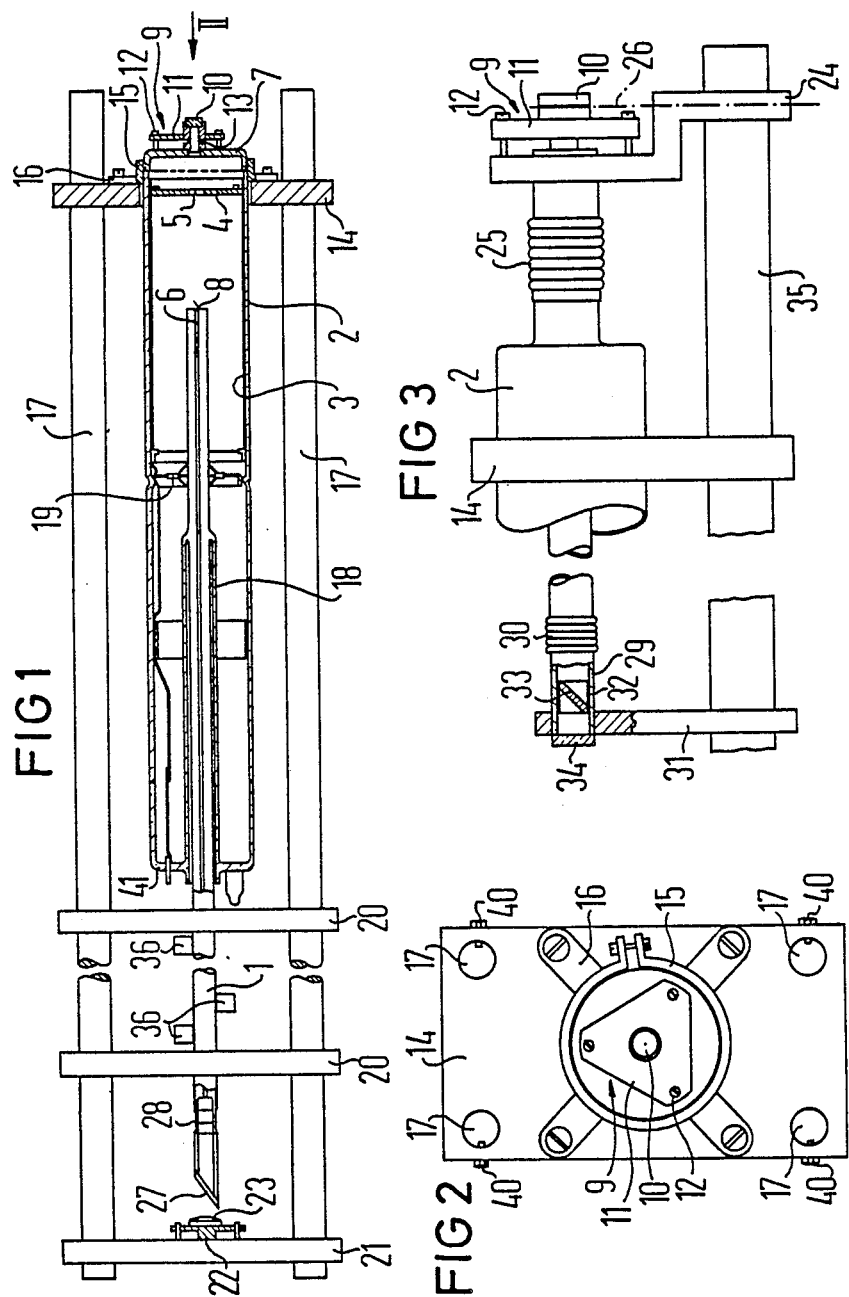

GAS LASER

BACKGROUND OF THE INVENTION

1. Field of the Invention

The present invention is related generally to a gas laser and, more particularly, to a gas laser having a housing tube and a capillary projecting into and beyond the housing tube.

2. Description of the Related Art

A gas laser is disclosed in U.S. Pat. No. 4,649,546 corresponding to German published application No. 33 05 462. Gas lasers, such as those described therein, are usually adjusted relative to an optical bench wherein the optical bench carries the two laser mirrors which provide the resonator for the laser. The optical bench is essentially composed of metal rods which have a coefficient of thermal expansion of approximately zero, at least in the range of the operating temperature of the laser.

The known gas lasers are terminated gas tight at both ends of the housing by Brewster windows, forming a structural unit which is fixed in position at an arbitrary location of their longitudinal extent relative to the optical bench. Length changes as a consequence of temperature fluctuations have no influence on the mutual position of the laser mirrors.

SUMMARY OF THE INVENTION

An object of the present invention is to increase laser power without altering the length of a gas laser. This and other objects of the invention are achieved in a gas laser having a housing tube surrounding at least a portion of a laser capillary tube, the housing tube having a mirror of the laser resonator connected in vacuum tight connection to the housing tube. Means are provided for adjusting the mirror relative to the optical bench in a preferred embodiment. The subject invention, thus, eliminates at least one Brewster window from the gas laser without deteriorating the precision of the mirror adjustment. The efficiency of the laser is noticably improved over that of known lasers as a result of the elimination of the Brewster window, since there are many reflections that occur in a laser even with the best Brewster windows that absorb laser energy to a noticable degree. Furthermore, additional losses are produced by positional deviations of the Brewster windows relative to one another in the known lasers, so that these losses are also avoided in the present device.

Advantageously, the first mirror of the gas laser is secured vacuum tight to an end face of the housing tube via a bellows and is fixed and adjusted relative to the optical bench via a separate mirror mount. In such case, the housing tube can be fixed axially at an arbitrary location along its length since length changes is a consequence of temperature fluctuations are intercepted by the bellows and, thus, have no influence on the mirror adjustment.

An especially simple embodiment is provided when the first mirror is rigidly, yet adjustably, connected to the housing tube and a mount for the housing tube is connected in the proximity of the first mirror. The housing tube mount includes a pipe clamp which surrounds the housing tube and which is fixed to the optical bench. The housing tube mount advantageously is connected as close as possible to the end of the housing tube so that potential length changes of the housing tube due to temperature changes have as little influence as possible on the position of the mirror.

An especially precisely adjustable embodiment of the invention is characterized by the features of a mirror mount for the first mirror that contains a terminating plate of metal which terminates the housing tube with a vacuum tight connection and which encompasses an adjustment means for the first mirror. This embodiment is especially compact in form and provides an especially high life expectancy of the laser without increasing the structural length thereof since the housing tube, which has an undiminished diameter, is brought extremely close to the mirror and an especially large gas volume is provided in the region of the mirror. This embodiment also provides an especially simple and exact adjustment of the mirror in that the adjustment mechanism is formed by a bendable zone element adjoining the terminating plate and by an adjustment plate connected to the bendable zone element. The adjustment plate carries at least two adjustment screws distributed over the circumference of the terminating plate with the adjustment screws pressing against the terminating plate.

An especially exact and temperature-independent mirror adjustment is achieved when the above-described terminating plate is provided in a housing mount which connects to the optical bench in the plane of the mirror. In this case, the effects of thermal expansion of the housing tube and of the mirror mount are completely suppressed. The only concern with this embodiment is that the transition, or connection of the mirror mount to the optical bench lies in the mirror plane and that the parts of the mirror mount lying between the optical bench and the mirror have the same coefficient of thermal expansion as one another.

A further enhancement of the laser power without increasing the length of the laser over that of known lasers is achieved in that the capillary which extends into the housing tube ends inside a hollow cathode of the laser and comprising the following features: The portion of the capillary within the housing tube is preferably supported against the housing tube by a spring and a cantilevered end of the capillary remains between the spring and the end face of the housing tube at which the first mirror is provided; Portions of the capillary outside the housing tube are supported by at least one support outside of the housing tube; The position of the capillary portions lying outside the housing tube are thereby adjusted relative to the optical bench; The cantilevered end of the capillary is somewhat shorter than one half the distance between the spring to the closest outside support which reduces the possible oscillatory amplitude of the capillary to a minimum for oscillations which are produced by mechanical vibrations in the apparatus. Oscillations in the capillary produce undesirable attenuations of the laser emission and by arranging the capillary supports as described, the oscillations are reduced to a minimum.

The described embodiments of the invention simultaneously increase the life expectancy of the laser by allowing a plasma discharge to occur over the full circumference of the hollow cathode since the capillary terminates inside the hollow cathode. This feature is used with particular advantage together with an embodiment having a metallic terminating plate of the housing tube.

The first mirror is advantageously composed of a material having a reflection of infrared radiation of wavelength of 3.39 micrometers of less than 2%, such as when the laser gas is composed of HeNe gas. As a result, the spectral line of wavelength 3.39 micrometers that is easily excited in HeNe gas lasers is largely suppressed. An even better suppression of the spectral line is achieved when a discharge channel of the capillary has a steadily tapering cross section. Spectral line suppression as a result of this feature can probably be explained on the basis that the infrared radiation is ordinarily excited by the wave guidance in a cylindrical capillary and that such wave guidance is suppressed by slight changes in diameter of the inside of the capillary tube.

A further increase in laser power is achieved when one of the mirrors is fully reflecting and is convexly shaped. As a result, the mode volume of the laser discharge and, thus, the light yield is increased. An additional intensification is achieved when the second mirror is partially reflecting and is concave in shape. A divergent light beam is beamed back into the discharge space as a result thereof.

As used herein, the term "rigidly connected" means a connection which permits an exact positional fixing, such as between a mirror and a housing tube. Adjustment of the mirror on the basis of the known adjustment mechanisms are not meant to be excluded by the term "rigidly connected" as used herein. Thus, the first mirror which is rigidly connected to the housing tube may also be adjustable relative thereto.

BRIEF DESCRIPTION OF THE DRAWINGS

FIG. 1 is a side view, partially in cross section, of a first embodiment of a gas laser in accordance with the principles of the present invention;

FIG. 2 is an end view in the direction of arrow II of the gas laser of FIG. 1; and FIG. 3 is a side elevational view of a another example of a laser of the present invention.

DESCRIPTION OF THE PREFERRED EMBODIMENTS

In FIGS. 1 and 2 is shown a gas laser which includes a laser capillary 1 extending into a housing tube 2 and ending within a hollow cathode 3. The hollow cathode 3 is terminated by an end wall 4 including a passage 5, the passage 5 lying in an imaginary extension of a discharge channel 6 that is formed within the capillary 1. In other words, the passage 5 is on the axis of the capillary 1. The housing tube 2 is terminated vacuum tight by a terminating plate 7, whereby the terminating plate 7 lies opposite and at a distance from an end face 8 of the capillary 1 within the housing tube 2. The terminating plate 7 is part of a mirror mount 9 for the first mirror 10 of the gas laser. The mirror mount 9 includes an adjustment mechanism which is composed of the terminating plate 7, a bendable zone element 13 adjoining thereto, an adjustment plate 11, and at least two but preferably three adjustment screws 12. The adjustment screws 12 are inserted into the adjustment plate 11 and press against the terminating plate 7. The bendable zone element 13 of a preferred embodiment is a bellows member.

An end of the housing tube 2 at the mirror side is connected to a housing mount 14 by a clip 15 via a bracket 16, as can be seen in FIG. 2. The housing mount 14 is mechanically rigidly connected to an optical bench which is essentially composed of four rods 17 having an extremely low temperature-dependent length variation. The term optical bench encompasses any type of mounting for the elements of a gas laser and is, therefore, not limited to the arrangement of rods shown. The housing mount 14 is secured against dislocation in an axial direction, such as by set screws 40 as shown in FIG. 2 abutting the rods 17. The hollow cathode 3 is mounted within the housing tube arranged electrically insulated from the terminating plate 7. An anode is, of course, provided at the opposite end of the capillary.

The capillary 1 is fixed in an axial direction by a fixing tube 18 which, in the illustrated embodiment, is connected to the capillary 1 at a location spaced from the ends of the housing tube 2 so that the fixing tube 18 is coaxial with the capillary 1 at a slight distance therefrom. The fixing tube 18 is connected vacuum tight to a second end face 41 of the housing tube 2. A spring 19 extending between the capillary 1 and the housing tube 2 supports the capillary 1 in a radial direction relative to the housing tube 2. The spring 19 is at the same or at a slightly shorter distance from the end face 8 of the capillary 1 relative to the distance from a centering means 20 for the capillary 1 lying outside the housing tube 2 which is situated closest to the spring 19. The centering means 20 supports the capillary 1 outside the housing tube 2. The described mounting or fixing of the capillary 1 and the housing tube 2 guarantees that lateral excursions of the capillary 1 are kept small during any mechanical vibrations of the capillary 1 which may be excited by vibrations in the device. Such vibrations or oscillations in the capillary 1 destroy laser energy and thereby diminish the power output of the laser.

Further centering mechanisms or means 20 that allow alignment or adjustment of the capillary 1 are situated outside of the housing tube 2 at appropriate intervals. A mirror mount 21 carries a second mirror 23 via an adjustment means 22 at an anode end of the laser. The second mirror 23 preferably has a convex surface so that the mode volume of the laser emission is enlarged and the light yield is, thus, intensified.

The discharge channel 6 in the capillary 1 is advantageously slightly comically shaped, having a thinner end of the discharge channel 6 in the proximity of the second convex mirror 23. The conical discharge space guarantees that no waveguide effects occur in the infrared range so that infrared lines, for example, having the wavelength of 3.39 micrometers when a HeNe gas laser is used, are not excited. The extremely slight conical shaping of the discharge space is provided although this feature is below the drafting precision and it is, therefore, not possible to show the angle accurately in the drawings. The length related change in diameter typically is about 3.5 $\mu$/cm.

In the embodiment of FIG. 1, the illustrated gas laser has an especially long life expectancy since a gas space is provided which extends close to the mirror 10 and so the gas volume is comparatively larger than for known gas lasers of the same length. Furthermore, since the plasma discharge of the operating laser, after departing the capillary 1, can ensue unimpeded to the hollow cathode 3 over the entire circumference thereof. This distributes the ordinarily concentrated plasma discharge so that a relatively low thermal stress of the electrode 3 occurs and undesirable sputtering effects and the like are avoided.

A Brewster window 27 shown in the embodiment of FIG. 1 is adjustable by a bendable zone element 28 in the region of a second mirror 23 at the anode end of the laser. The bendable zone element 28 is preferably a bellows. Compared to known embodiments having two Brewster windows, the mutual arrangement or adjustment of Brewster windows relative to a circumferential angle is eliminated in the present invention.

Magnets 36 are advantageously secured to the capillary 1, as shown in FIG. 1, such as by a glass solder or glue. The capillary 1 is sufficiently supported to provide the necessary mechanical strength to hold the magnets 36. The magnets 36 contribute, as is known, to increasing the power output of the laser.

Referring to the embodiment of FIG. 3, a gas laser is shown which is especially precisely adjustable. In FIG. 3, elements of the invention which are the same as those of FIG. 1 are given identical reference characters. By providing a housing mount 14' in the second embodiments secured at an arbitrary location of the housing tube 2' to secure the housing tube 2' against axial dislocations relative to an optical bench 35 and by providing a separate mirror mount 24, the mirror 10 is decoupled, or uneffected, by length variations of the housing tube 2'. A bellows 25 is mounted between the housing tube 2' and the mirror mount 24 to absorb thermally induced axial dislocations of the housing tube as well as to provide a vacuum tight connection to the housing tube 2'. The mirror mount 24 is mechanically, rigidly connected to the optical bench 35 in the mirror plane 26 of the mirror 10. The mirror mount 24 is preferably composed of a material having substantially the same temperature coefficient as the parts of mirror adjustment mechanism, or mirror mount, 9' which holds the mirror 10. Parts which do not lead to the mirror 10, for example, the adjustment screws, maybe composed of other materials insofar as they arranged axially symmetrically or distributed over the circumference of a circle which is axially symmetrical relative to the mirror 10. The embodiment of FIG. 3, thus, guarantees complete suppression of the coefficient of thermal expansion on the laser tube and of the laser mount.

When, as shown in FIG. 3, a bendable zone 28 is formed as a bellows 30, then a mirror 34 at the anode side of the laser can be integrated in the capillary 1. For this purpose, one Brewster window 33 is advantageously held in a cage 32 and is accommodated in a pipe section or insulating tube 29 of electrically insulating material. The insulating tube, or pipe section, 29 is terminated vacuum tight by the mirror 34. The insulating tube 29 is also fixed to the optical bench 35 by a mount 31. The single Brewster window 33 thus only has to guarantee polarization of the laser emission and need not be connected in a vacuum tight connection to the capillary 1.

When compared to the embodiment of FIG. 1, the embodiment of FIG. 3 enables the housing tube to be fastened anywhere along its length for the most beneficial effect. The housing mount 14', for example, may be attached at the center of gravity of the laser so that stressing of the laser housing tube is particularly low.

Although other modifications and changes may be suggested by those skilled in the art, for example one of the mirrors may be slightly movable in axial direction fine adjustment or modulation of the resonator length. It is the intention of the inventors to embody within the patent warranted hereon all changes and modifications as reasonably and properly come within the scope of their contribution to the art.

We claim:

1. A gas laser, comprising:
    a housing tube having first and second opposite end faces;
    a capillary being longer than said housing tube and projecting into said housing tube from said first end face, said capillary forming a discharge channel for said gas laser, said capillary being connected vacuum-tight to said first end face of said housing tube and having a first end lying outside said housing tube and a second end lying inside said housing tube, said second end being free of optical elements;
    an optical element connected as a vacuum-tight termination at said first end of said capillary lying outside said housing tube;
    a hollow cathode mounted in said housing tube;
    a flexible support retaining said capillary in a radial position relative to said housing tube;
    a first mirror positioned on an axis of said capillary beyond said second end of said capillary and connected vacuum-tight to said housing tube;
    an optical bench;
    a housing mount fixing said housing tube in an axial position relative to said optical bench;
    means for aligning said capillary relative to said optical bench in a plane perpendicular to said capillary at least at two axially spaced locations, said means for aligning being fastened to said capillary outside said housing tube;
    a second mirror being secured to said optical bench and lying on an axis of said capillary opposite said first mirror; and
    mean for adjusting said second mirror relative to said first mirror such that said capillary is adjustable by said aligning means to align said capillary relative to said first and second mirrors to avoid output power loss.

2. A gas laser as claimed in claim 1, further comprising:
    a bellows securing said first mirror to said second end of said housing tube in vacuum-tight connection; and
    a separate mirror mount fixing said first mirror to said optical bench, said separate mirror mount being adjustable to adjust said first mirror relative to said optical bench.

3. A gas laser as claimed in claim 2, further comprising:
    means for fixing said mirror mount to said optical bench in a plane of said first mirror.

4. A gas laser as claimed in claim 1, further comprising:
    means for rigidly and vacuum-tight connecting said first mirror to said housing tube, and
    said housing mount lying in proximity to said first mirror.

5. A gas laser as claimed in claim 4, wherein said means for connecting said first mirror to said housing tube includes a terminating plate of metal forming a vacuum-tight termination at said second end face of said housing tube; and
    an adjustment mechanism for said first mirror on said terminating plate.

6. A gas laser as claimed in claim 5, wherein said adjustment mechanism includes:
    a bendable zone element adjoining said termination plate;
    an adjustment plate following said bendable zone element; and
    at least two adjustment screws carried in said adjustment plate and distributed over a circumference of said terminating plate, said at least tow adjustment screws pressing against said terminating plate.

7. A gas laser as claimed in claim 1, wherein
said second end of said capillary in said housing tube ends inside said hollow cathode;
said flexible support is a spring connected to support said capillary against said housing tube;
said end of said capillary in said housing tube is a cantilevered end extending to between said spring and said second end face of said housing tube;
said means for adjusting said capillary including at least one centering means supporting said capillary outside said housing tube, said centering means being adjusted to position said capillary relative to said optical bench; and
said cantilevered end of said capillary being shorter than half a distance between said spring and a closest one of said centering means.

8. A gas laser as claimed in claim 1, wherein said first mirror is of a material having a reflection of infrared radiation of wavelength of 3.39 μm of less than 0.2%, and wherein a laser gas of said laser consists essentially of a HeNe mixture.

9. A gas laser as claimed in claim 1, wherein said capillary has a discharge channel of substantially steadily tapering cross section.

10. A gas laser as claimed in claim 1, wherein said first mirror is totally reflecting to a laser emission of said gas laser and has a convex surface, and said second mirror has a concave surface.

11. A gas laser as claimed in claim 1, wherein said second mirror is at anode side of said gas laser, and further comprising:
an insulating tube connected vacuum-tight to said second mirror;
a bellows connecting said insulating tube to said capillary in a vacuum-tight connection; and
a separate mount fixing said insulating tube to said optical bench.

12. A gas laser as claimed in claim 1, further comprising:
magnets secured to said capillary.

13. A gas laser as claimed in claim 12, wherein glass solder secures said magnets to said capillary.

14. A gas laser as claimed in claim 12, wherein glue secures said magnets to said capillary.

15. A gas laser, comprising:
an elongated laser capillary having first and second opposite ends and a discharge channel extending through said capillary along an optical axis;
first and second mirrors lying on said optical axis beyond respective said first and second ends of said capillary to form a laser resonator;
a housing encasing said first end of said capillary, said second end of said laser capillary being outside said housing;
means for adjustably connecting said first mirror to an end of said housing in vacuum-tight connection; and
means for adjustable mounting said laser capillary relative to said housing yet fixing said laser capillary axially relative to said housing, said means for adjustably mounting being sufficiently flexible to enable optimal adjustment of said capillary to be made said means for adjustably mounting including means engaging said laser capillary outside said housing.

16. A gas laser as claimed in claim 15, further comprising:
a hollow electrode substantially surrounding said at least one end of said capillary encased in said housing.

17. A gas laser as claimed in claim 15, further comprising:
only one Brewster window mounted along said optical axis of said laser.

18. A gas laser as claimed in claim 17, wherein said Brewster window is connected in vacuum-tight connection to said capillary, and said Brewster window is mounted spaced from said second mirror.

19. A gas laser as claimed in claim 15, wherein said means for adjustably mounting includes
a fixing tube connected between said laser capillary and said housing, said fixing tube extending coaxially of said capillary and being substantially rigid in an axial direction and flexible in a radial direction.

20. A gas laser as claimed in claim 16, further comprising:
an optical bench;
means for mounting said housing to said optical bench; and
means for rigidly connecting said first mirror to said optical bench, said means for rigidly connecting including:
an adjustable plate holding said first mirror,
a fixed member fixed in position relative to said optical bench,
adjustment screws mounted to permit adjustment of a position of said adjustment plate relative to said fixed member, and
a bendable zone element extending between said adjustment plate and said fixed member and providing a vacuum-tight connection therebetween.

21. A gas laser as claimed in claim 20, wherein said fixed member is a terminating plate connected directly to said housing in vacuum-tight fashion.

22. A gas laser as claimed in claim 20, wherein said fixed member is a mirror mount connected directly to said optical bench, and further comprising:
a bellows connected in vacuum-tight connecting between said mirror mount and said housing.

* * * * *